United States Patent
Sato et al.

(10) Patent No.: US 12,474,567 B2
(45) Date of Patent: Nov. 18, 2025

(54) IMAGE PICKUP UNIT AND ENDOSCOPE

(71) Applicant: OLYMPUS MEDICAL SYSTEMS CORP., Tokyo (JP)

(72) Inventors: Yuta Sato, Chofu (JP); Shuichi Takie, Hachioji (JP)

(73) Assignee: OLYMPUS MEDICAL SYSTEMS CORP., Tokyo (JP)

( * ) Notice: Subject to any disclaimer, the term of this patent is extended or adjusted under 35 U.S.C. 154(b) by 0 days.

(21) Appl. No.: 18/819,402

(22) Filed: Aug. 29, 2024

(65) Prior Publication Data
US 2024/0418980 A1  Dec. 19, 2024

Related U.S. Application Data

(63) Continuation of application No. PCT/JP2022/027738, filed on Jul. 14, 2022.

(51) Int. Cl.
  *G02B 23/24* (2006.01)
  *H04N 23/50* (2023.01)
  *H04N 23/54* (2023.01)

(52) U.S. Cl.
  CPC ......... *G02B 23/2484* (2013.01); *H04N 23/54* (2023.01); *H04N 23/555* (2023.01)

(58) Field of Classification Search
  CPC ... G02B 23/2484; H04N 23/54; H04N 23/555
  USPC .......................................................... 348/76
  See application file for complete search history.

(56) References Cited

U.S. PATENT DOCUMENTS

| | | | | |
|---|---|---|---|---|
| 6,064,458 | A * | 5/2000 | Mori ................. | G02F 1/133784 349/126 |
| 7,001,186 | B1 * | 2/2006 | Chen ..................... | H01R 13/22 439/923 |
| 2007/0193520 | A1 * | 8/2007 | Kim .................. | H01L 21/68742 118/729 |
| 2010/0151192 | A1 * | 6/2010 | Saito ..................... | H10F 39/804 428/137 |
| 2014/0245956 | A1 * | 9/2014 | Kita ...................... | C04B 41/009 118/721 |
| 2016/0245683 | A1 * | 8/2016 | Igarashi .................. | G01F 15/18 |
| 2016/0369422 | A1 * | 12/2016 | Fujikata .................. | C25D 7/12 |
| 2017/0127921 | A1 * | 5/2017 | Motohara .............. | H04N 23/57 |
| 2017/0150875 | A1 * | 6/2017 | Shimizu ............. | G02B 23/2484 |
| 2018/0139875 | A1 * | 5/2018 | Yoo ........................ | B41F 15/34 |

(Continued)

FOREIGN PATENT DOCUMENTS

| CN | 216132947 U | 3/2022 |
|---|---|---|
| JP | 6013657 B1 | 10/2016 |

(Continued)

OTHER PUBLICATIONS

International Search Report dated Aug. 23, 2022 received in PCT/JP2022/027738.

*Primary Examiner* — Matthew David Kim
(74) *Attorney, Agent, or Firm* — Scully, Scott, Murphy & Presser, P.C.

(57) ABSTRACT

The image pickup unit includes an image pickup device, a first substrate, and a second substrate that are connected in this order. The second substrate includes a side surface formed in a direction crossing a light-receiving surface of the image pickup device. The second substrate includes, in the side surface thereof, a recessed portion into which a jig is inserted to hold the image pickup unit.

13 Claims, 14 Drawing Sheets

(56) References Cited

U.S. PATENT DOCUMENTS

2022/0365187 A1* 11/2022 Kodama ............... G01S 7/497
2024/0219291 A1*  7/2024 Sim ..................... G01N 1/36
2024/0355662 A1* 10/2024 Sakaue ............... H01L 21/681

FOREIGN PATENT DOCUMENTS

WO      2016092986 A1     6/2016
WO      2016203797 A1    12/2016

* cited by examiner

IMAGE PICKUP UNIT AND ENDOSCOPE

CROSS-REFERENCE TO RELATED APPLICATION

This application is a continuation application of PCT/JP2022/027738 filed on Jul. 14, 2022, the entire contents of which are incorporated herein by this reference.

BACKGROUND OF THE INVENTION

1. Field of the Invention

The present disclosure relates to a packaged image pickup unit to which cables are connected, and an endoscope including the image pickup unit.

2. Description of the Related Art

Conventionally, endoscopes have been widely used for various kinds of examination in medical fields and industrial fields. Endoscopes include an insertion portion configured to be inserted into a subject.

Endoscopes include, at a distal end of an insertion portion thereof, an image pickup unit including an image sensor and a circuit substrate on which electronic components for driving the image sensor are mounted.

International publication No. WO 2016/092986, for example, discloses an image pickup unit as a semiconductor package provided with an irregularly-shaped circuit substrate which is an MID (Molded Interconnect Device) substrate on which a three-dimensional wiring is formed by injection molding.

Such an image pickup unit is composed of a very small component, one side of which is about 1 to 2 millimeters. Therefore, when an operation for soldering cables is performed, it is necessary to stably hold the very small image pickup unit.

The image pickup unit includes, at a middle part thereof, a circuit substrate. In a conventional operation for soldering cables to a small-sized image pickup unit, a circuit substrate is gripped by a jig so as to pinch the circuit substrate from the side surfaces thereof.

SUMMARY OF THE INVENTION

An image pickup unit according to one aspect of the present disclosure includes an image pickup device, a first substrate, and a second substrate that are connected in this order. The second substrate includes: a side surface formed in a direction crossing a light-receiving surface of the image pickup device, and a recessed portion into which a jig is inserted to hold the image pickup unit, the recessed portion being formed in the side surface.

An image pickup unit according to another aspect of the present disclosure includes an image pickup device, a first substrate, and a second substrate that are connected in this order. The second substrate includes: a base material with no interface; a plurality of wirings provided on a surface of the base material; a side surface formed in a direction crossing a light-receiving surface of the image pickup device; and a recessed portion into which a jig is inserted to hold the image pickup unit, the recessed portion being formed in the side surface.

An endoscope according to one aspect of the present disclosure includes: an insertion portion configured to be inserted into a subject; an image pickup unit provided in the insertion portion. The image pickup unit includes an image pickup device, a first substrate, and a second substrate that are connected in this order from a distal end side. The second substrate includes a side surface formed in a direction crossing a light-receiving surface of the image pickup device, and the side surface includes a recessed portion into which a jig is inserted to hold the image pickup unit.

DETAILED DESCRIPTION OF THE PREFERRED EMBODIMENT(S)

Hereinafter, description will be made by taking an image pickup unit according to the present disclosure and an endoscope as an insertion instrument which includes the image pickup unit at a distal end of an insertion portion of the endoscope, as examples. Note that, in the description below, each of the drawings based on each embodiment is a pattern diagram, and care should be taken to the fact that the relationship between the thicknesses and widths of the respective parts, a ratio of the thickness of a certain part to that of another part, and the like are different from the actual ones, and there is a case where the respective drawings include parts in which the relationships and ratios among the dimensions are different.

Figure 1:
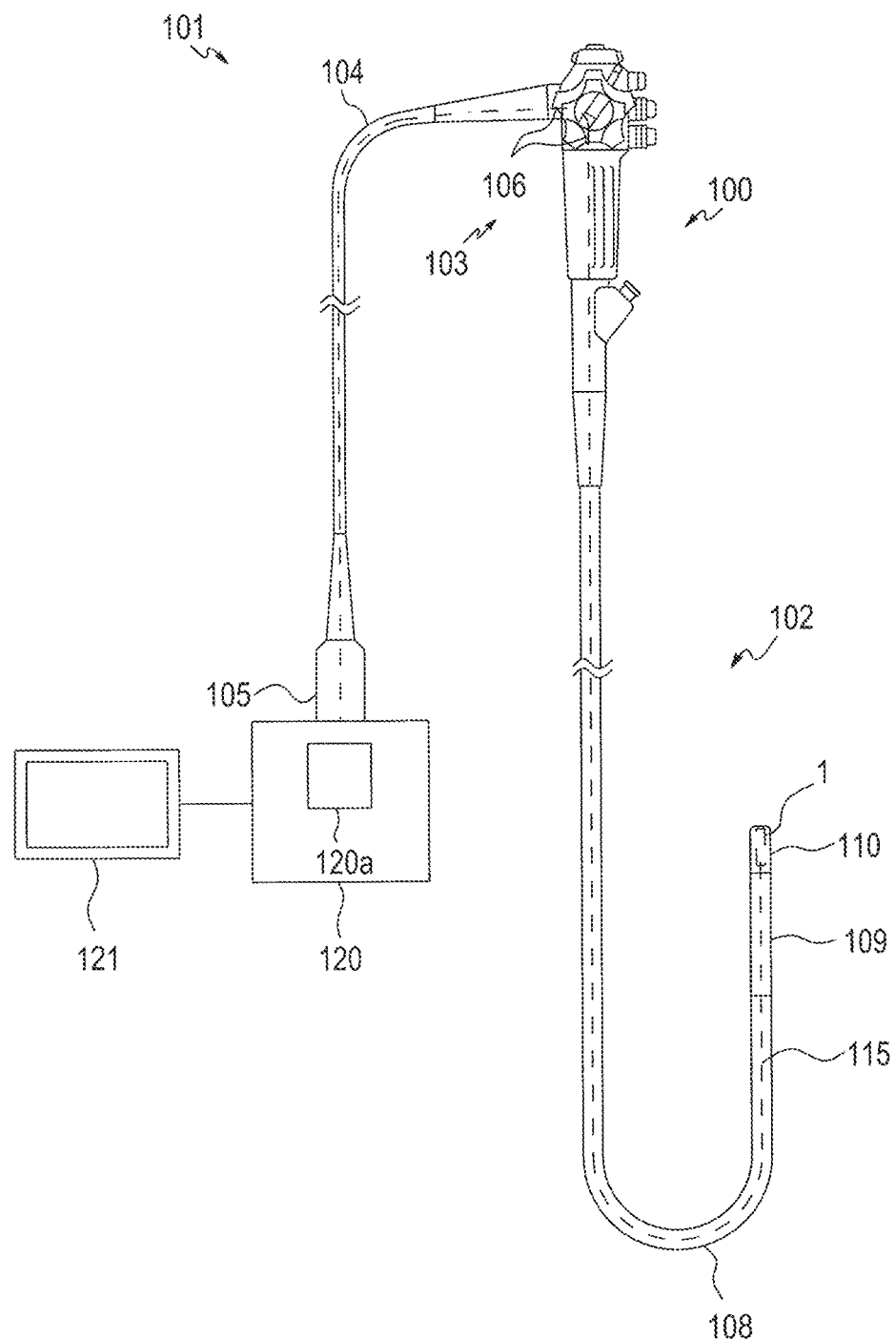
FIG. 1 is a view showing a configuration of an endoscope apparatus.

First, with reference to FIG. 1, description will be made on one example of a configuration of an endoscope apparatus 101 including an image pickup unit 1 according to one aspect of the present disclosure. The endoscope apparatus 101, which is an endoscope system of the present embodiment, includes an endoscope 100, an external apparatus 120, and an image display section 121.

The endoscope 100 is configured to be insertable into a subject such as a human body, and to optically pick up an image of a predetermined observation site in the subject. Note that the subject into which the endoscope 100 is inserted is not limited to a human body, but may be another living body, or artificial object such as machine or structure.

The endoscope 100 includes an insertion portion 102, an operation portion 103, and a universal cord 104. The insertion portion 102 is configured to be introduced into a subject. The operation portion 103 is provided continuously with the proximal end of the insertion portion 102. The universal cord 104 is extended from a side portion of the operation portion 103.

The insertion portion 102 includes a distal end portion 110, a bending portion 109, and a flexible tube portion 108.

The distal end portion 110 is disposed at the distal end of the insertion portion. The bending portion 109 is disposed on the proximal end side of the distal end portion 110. The bending portion 109 has a bendable structure. The flexible tube portion 108 has a flexibility. The flexible tube portion 108 is provided continuously with the proximal end side of the bending portion 109. The flexible tube portion 108 is connected to the distal end side of the operation portion 103.

The endoscope 100 in the present embodiment is shown by taking a configuration of what is called a flexible endoscope having the flexible insertion portion 102, as an example. Note that the endoscope 100 may be what is called a rigid endoscope configured such that the insertion portion 102 is rigid.

The distal end portion 110 is provided with the image pickup unit 1. The image pickup unit 1 in the present embodiment is a CSP (chip size package) image pickup module.

The operation portion 103 is provided with an angle operation knob 106. The angle operation knob 106 is an operation lever for operating the bending of the bending portion 109.

The universal cord 104 includes, at the proximal end portion thereof, an endoscope connector 105. The endoscope connector 105 is detachably connected to the external apparatus 120. The external apparatus 120 is connected to the image display section 121 such as a monitor, through a cable.

In addition, the endoscope 100 includes a composite cable 115 inserted through the universal cord 104, the operation portion 103, and the insertion portion 102. Various electric cables, an optical fiber bundle, and the like (which are not shown) are inserted through the composite cable 115. The optical fiber bundle transmits illumination light from a light source section provided in the external apparatus 120.

The various electric cables of the composite cable 115 electrically connect the endoscope connector 105 and the image pickup unit 1. The endoscope connector 105 is connected to the external apparatus 120. Thus, the image pickup unit 1 is electrically connected to the external apparatus 120 by the composite cable 115.

Power supply from the external apparatus 120 to the image pickup unit 1 and communication between the external apparatus 120 and the image pickup unit 1 are performed through the composite cable 115.

The external apparatus 120 is provided with an image processing section 120a. The image processing section 120a generates a video signal based on an image pickup device output signal (image signal) outputted from the image pickup unit 1. Then, the image processing section 120a outputs the video signal to the image display section 121. According to the present embodiment, an optical image (endoscopic image) obtained by image pickup by the image pickup unit 1 is displayed as video on the image display section 121.

The image display section 121 is a display using a liquid crystal or an organic EL (electroluminescence), for example. Note that the endoscope 100 is not limited to the configuration in which the endoscope 100 is connected to the external apparatus 120 or the image display section 121, but may be configured to include a part of or an entirety of the image processing section and monitor, for example.

In addition, the optical fiber bundle is configured to transmit the light emitted from the light source section of the external apparatus 120 to an illumination window of the distal end portion 110. The illumination window functions as an illumination light emission portion. Furthermore, the light source section does not have to be disposed in the external apparatus 120 but may be disposed in the operation portion 103 or the distal end portion 110 of the endoscope 100. The light source section may be configured using an LED.

Next, description will be made on the configuration of the image pickup unit 1 provided in the distal end portion 110. Note that, in the description below, the up, down, left, and right directions of the image pickup unit 1 will be described as the up, down, left, and right directions toward the paper surface of each of the drawings.

Figure 2:
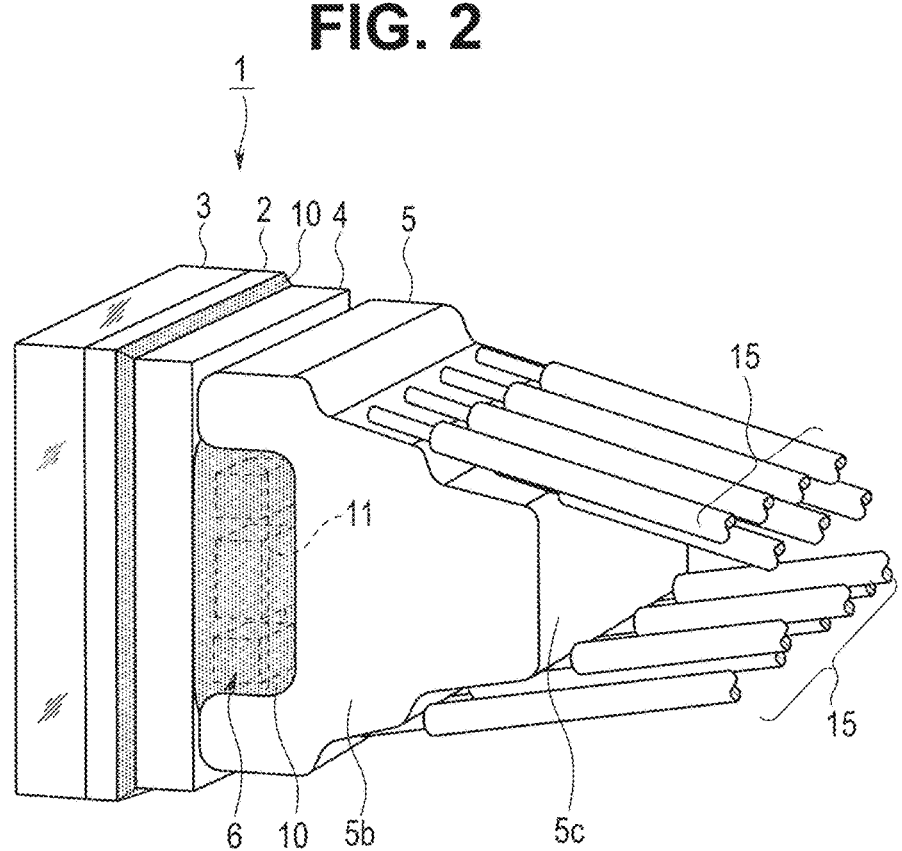
FIG. 2 is a perspective view of an image pickup unit viewed from rearward and diagonally upward left side.
Figure 3:
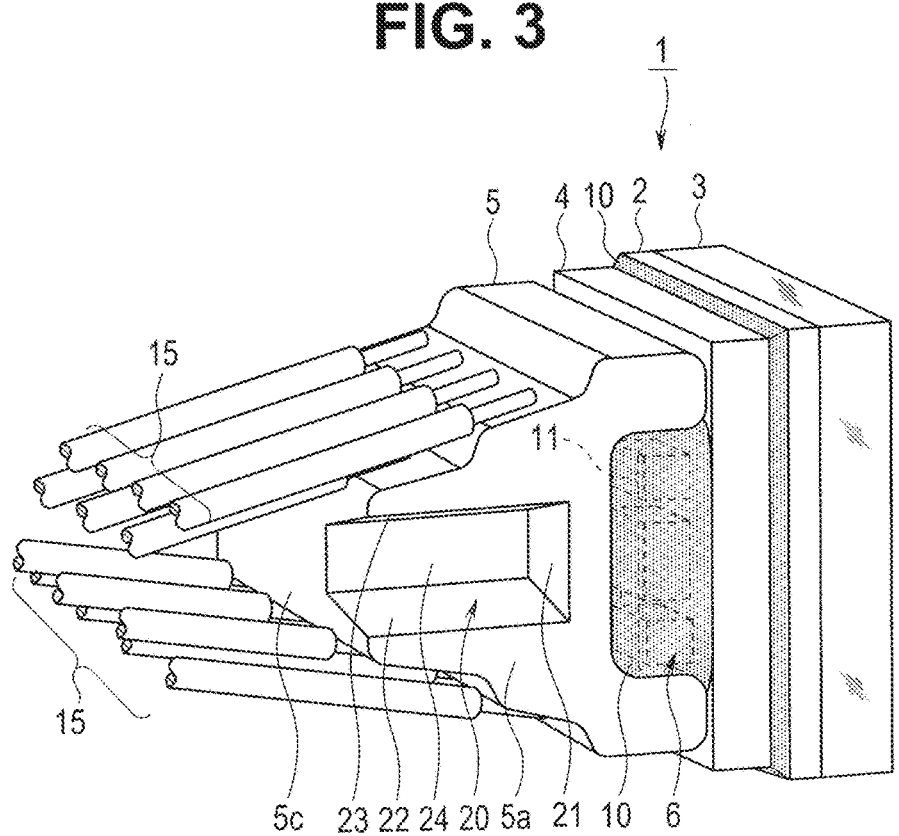
FIG. 3 is a perspective view of the image pickup unit viewed from rearward and diagonally upward right side.

As shown in FIGS. 2 and 3, the image pickup unit 1 according to the present embodiment includes a glass lid 3 of a protection glass (cover glass), an image pickup device 2, a planar circuit substrate 4 as a first substrate, and an irregularly-shaped circuit substrate 5 as a second substrate, which are stacked in this order from the distal end side.

The image pickup device 2 is an image sensor configured to receive an optical image of an observation object, which is formed by an image-forming optical lens unit (not shown). The image pickup device 2 is configured to perform predetermined photoelectric conversion processing on the received optical image. Then, the image pickup device 2 generates an image signal of the observation object.

The image pickup device 2 is, for example, an image sensor of a common configuration, such as a CCD (charge coupled device) or a CMOS (complementary metal oxide semiconductor).

The image pickup device 2 includes the glass lid 3 on the front surface (light-receiving surface) as the distal end surface thereof. Note that, in the state where the image pickup unit 1 is disposed in the distal end portion 110 of the endoscope 100, the image-forming optical lens unit (not shown) is disposed on the front side (distal end side) of the image pickup device 2.

In this state, the image-forming optical lens unit is arranged such that an optical axis O (see FIGS. 11, 15, and 16) substantially coincides with an axis (center axis) that passes through the center of the light-receiving surface of the image pickup device 2 and perpendicular to the light-receiving surface. The front surface of the image pickup device 2 is orthogonal to the optical axis of the image-forming optical lens unit.

With such a configuration, the light from the observation object, which is condensed by the image-forming optical lens unit, is incident from the front surface, which is the distal end surface, of the glass lid 3. Then, the light passes through the glass lid 3 to be image-formed on the light-receiving surface of the image pickup device 2.

In addition, the image pickup device 2 includes, on the rear surface as the proximal end surface thereof, a plurality of electrodes, a plurality of solder pastes each formed in a bump shape on each of the plurality of electrodes (none of them is shown).

The planar circuit substrate 4 is a circuit substrate in a planar shape. The planar circuit substrate 4 is a multi-layer structure substrate formed by stacking a plurality of substrates, for example. Examples of the substrates stacked in the planar circuit substrate 4 include a ceramic substrate, an epoxy glass substrate, a flexible substrate, a glass substrate, a silicone substrate, and the like. The planar circuit substrate 4 is provided substantially in parallel with the image pickup device 2.

On the front surface, which is a distal end surface, of the planar circuit substrate 4, connection lands (not shown) are provided. The connection lands are a plurality of electrodes electrically connected to the respective electrodes on which the solder pastes are applied of the image pickup device 2. These connection lands are electrically connected to the respective electrodes of the image pickup device 2 by the respective solder pastes being fused by reflow processing.

With such processing, the planar circuit substrate 4 and the image pickup device 2 are electrically and mechanically connected to each other. Note that a gap between the planar circuit substrate 4 and the image pickup device 2 is filled with an underfill agent 10, which is a curing resin.

A plurality of electronic components 11 are mounted on the rear surface, which is the proximal end surface, of the planar circuit substrate 4. The electronic components 11 include a capacitor, a resistor, a coil, a transistor, a diode, a driving IC, and the like, for example.

In addition, on the rear surface of the planar circuit substrate 4, the plurality of electrodes (not shown), which are connection lands, are provided. The respective electrodes are arranged in peripheral regions in the up-down direction of the planar circuit substrate 4. The plurality of electrodes are connecting electrodes for connecting the planar circuit substrate 4 and the irregularly-shaped circuit substrate 5.

The irregularly-shaped circuit substrate 5 is what is called a three-dimensional circuit substrate having a three-dimensional structure. The irregularly-shaped circuit substrate 5 in the present embodiment is, for example, an MID (molded interconnect device) substrate in which three-dimensional wirings are formed on a resin component obtained by injection molding. Note that the irregularly-shaped circuit substrate 5 is not limited to the MID substrate, but may be a substrate formed of a base material with no interface, for example, a ceramic substrate, an epoxy glass substrate, a glass substrate, or a silicone substrate.

On the front surface of the irregularly-shaped circuit substrate 5, a plurality of electrodes, not shown, which correspond to and electrically connected to the respective electrodes of the planar circuit substrate 4, are provided. The front surface of the irregularly-shaped circuit substrate 5 is divided into upper and lower portions by a recessed portion 6 configured such that the distal end side and the side portion side thereof are open.

The recessed portion 6 is formed at substantially the center portion in the up-down direction on the front side of the irregularly-shaped circuit substrate 5. Note that the irregularly-shaped circuit substrate 5 is configured such that the plurality of electronic components 11 provided on the planar circuit substrate 4 are housed in the recessed portion 6 in a state where the irregularly-shaped circuit substrate 5 is connected to the planar circuit substrate 4.

Such a configuration prevents interference between the irregularly-shaped circuit substrate 5 and the plurality of electronic components 11 when the irregularly-shaped circuit substrate 5 is connected to the planar circuit substrate 4. Note that the inside of the recessed portion 6 is filled with the underfill agent 10, which is the curing resin, to cover the electronic components 11.

Figure 4:
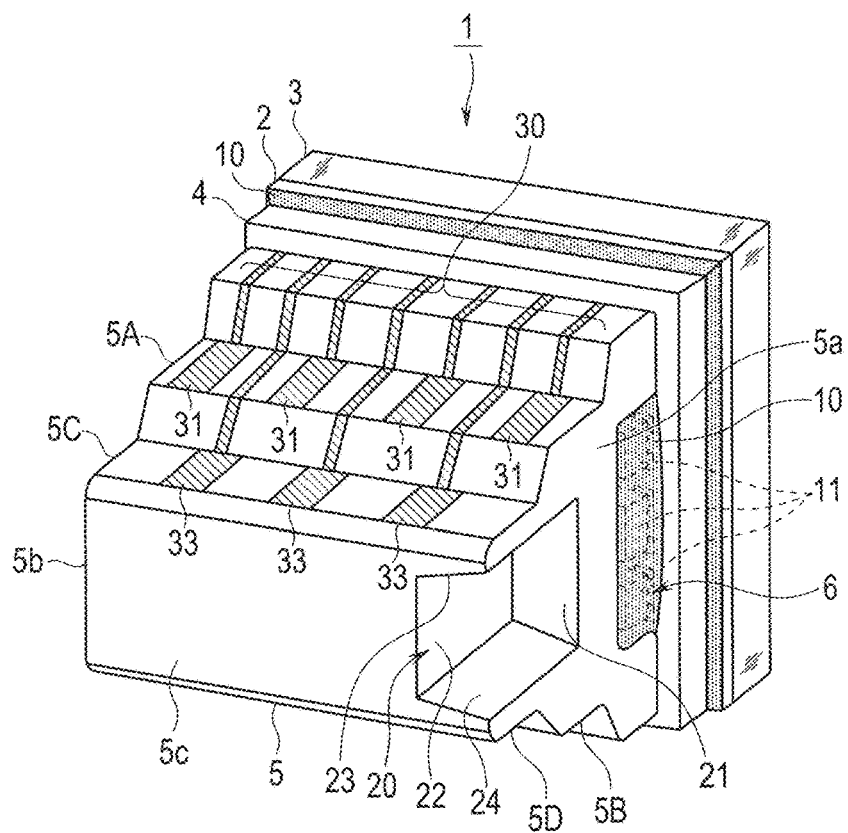
FIG. 4 is a perspective view of the image pickup unit viewed from rearward.

As shown in FIG. 4, the irregularly-shaped circuit substrate 5 is configured such that the left and right side surfaces are formed to be planes and the upper and lower side surfaces are formed in a stepped shape. Specifically, the irregularly-shaped circuit substrate 5 has a first side surface 5a on the right side when viewed toward the paper surface. Note that the first side surface 5a is a surface located on the left side when viewing the image pickup unit 1 from the front side.

The irregularly-shaped circuit substrate 5 includes a second side surface 5b on the left side when viewed toward the paper surface, the second side surface 5b being on the opposite side of the first side surface 5a. Note that the second side surface 5b is a surface located on the right side when viewing the image pickup unit 1 from the front side.

The irregularly-shaped circuit substrate 5 is configured such that the upper surface viewed toward the paper surface is formed in a stepped shape, and includes a third side surface 5A located at a midway position of the upper surface. The third side surface 5A is a surface intersecting the first side surface 5a and the second side surface 5b.

In addition, the irregularly-shaped circuit substrate 5 is configured such that the lower surface viewed toward the paper surface is also formed in a stepped shape, and includes a fourth side surface 5B located at a midway position of the lower surface. The fourth side surface 5B is also a surface intersecting the first side surface 5a and the second side surface 5b. The third side surface 5A and the fourth side surface 5B are the surfaces located on the opposite sides in the up-down direction.

Furthermore, the irregularly-shaped circuit substrate 5 includes a fifth side surface 5C located on a proximal end of the upper surface and a sixth side surface 5D located on a proximal end of the lower surface. Each of the fifth side surface 5C and the sixth side surface 5D is also a surface intersecting the first side surface 5a and the second side surface 5b. The fifth side surface 5C and the sixth side surface 5D are the surfaces located on the opposite sides in the up-down direction.

Note that the third side surface 5A and the fifth side surface 5C are the surfaces located on the upper side of the light-receiving surface of the image pickup device 2 when the image pickup unit 1 is viewed from the front side. In addition, the fourth side surface 5B and the sixth side surface 5D are the surfaces located on the lower side of the light-receiving surface of the image pickup device 2 when the image pickup unit 1 is viewed from the front side.

Each of the first side surface 5a to the sixth side surface 5D is a surface formed in a direction intersecting the light-receiving surface of the image pickup device 2. In detail, each of a plane including the first side surface 5a, a plane including the second side surface 5b, a plane including the third side surface 5A, a plane including the fourth side surface 5B, a plane including the fifth side surface 5C, and a plane including the sixth side surface 5D crosses a plane including the light-receiving surface. Each of normal lines of the first side surface 5a to the sixth side surface 5D intersects a normal line of the light-receiving surface.

Figure 6:
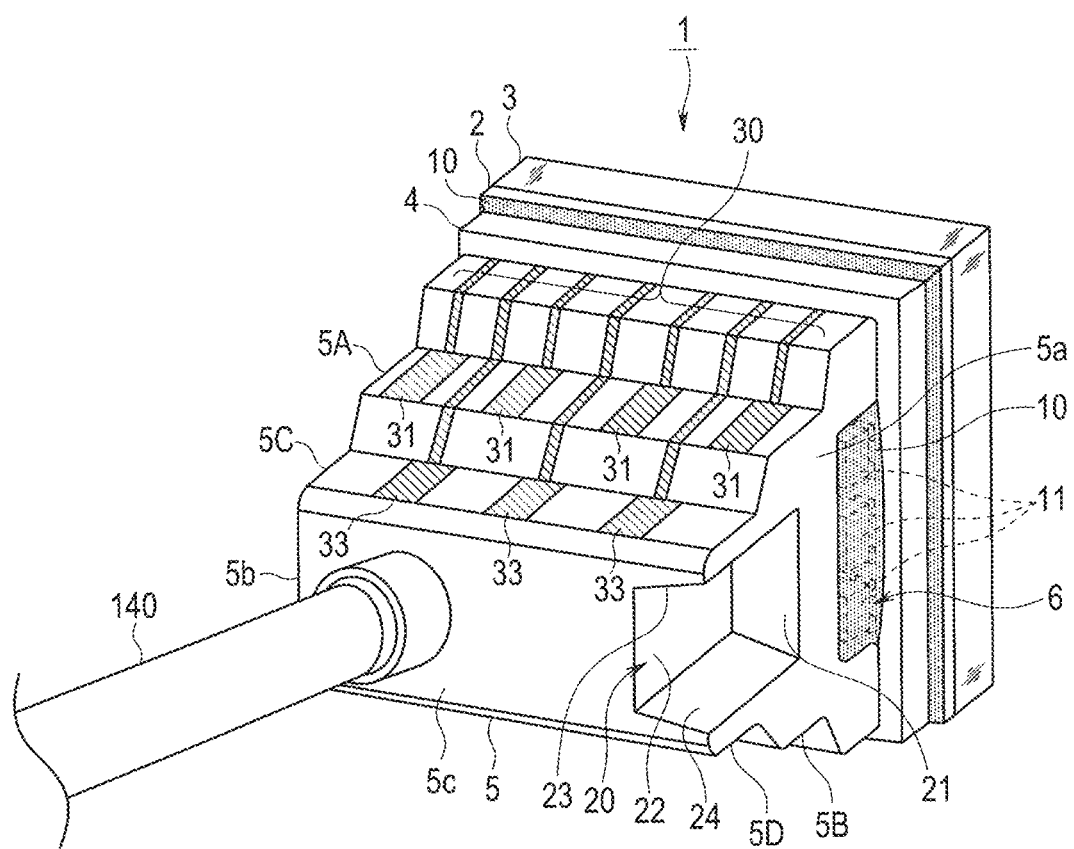
FIG. 6 is a perspective view, which is viewed from rearward, showing a state where a proximal end surface of the image pickup unit is sucked by a suction holding tool.

On the upper and lower surfaces of the irregularly-shaped circuit substrate 5, a plurality of three-dimensional wirings 30, and a plurality of cable connecting lands 31, 32, 33, and 34 of the electrodes connected respectively to the three-dimensional wirings 30 are formed (see FIG. 6). Core wires 16 of image pickup cables 15 are electrically connected respectively to the plurality of cable connecting lands 31, 32, 33, and 34 by soldering (see FIG. 10 and FIG. 11), or the like. Note that the plurality of image pickup cables 15 are bundled to be inserted and arranged in the composite cable 115 shown in FIG. 1.

Note that the irregularly-shaped circuit substrate 5 includes, on the third side surface 5A located at the midway position of the upper surface, the plurality of cable connecting lands 31 which are first electrodes. In addition, the irregularly-shaped circuit substrate 5 includes, on the fourth side surface 5B located at the midway position of the lower surface, the plurality of cable connecting lands 32 which are second electrodes.

Furthermore, the irregularly-shaped circuit substrate 5 includes, on the fifth side surface 5C located at the proximal end of the upper surface, the plurality of cable connecting lands 33 which are third electrodes. In addition, the irregularly-shaped circuit substrate 5 includes, on the sixth side surface 5D located at the proximal end of the lower surface, the plurality of cable connecting lands 34 which are fourth electrodes.

The irregularly-shaped circuit substrate 5 includes a recessed portion 20 that is open on the first side surface 5a and on the proximal end surface 5c which is a rear surface. The recessed portion 20 is formed by an end surface 21 as an inner surface on the front side, a bottom surface 22, and two inclined surfaces 23 and 24, which are upper and lower inner surfaces.

The bottom surface 22 is located inside the irregularly-shaped circuit substrate 5, and formed on a surface which is substantially parallel to the first side surface 5a.

The inclined surfaces 23, 24 provided at the upper and lower positions are tapered surfaces formed such that a separation distance therebetween becomes smaller toward the bottom surface 22.

Figure 5:
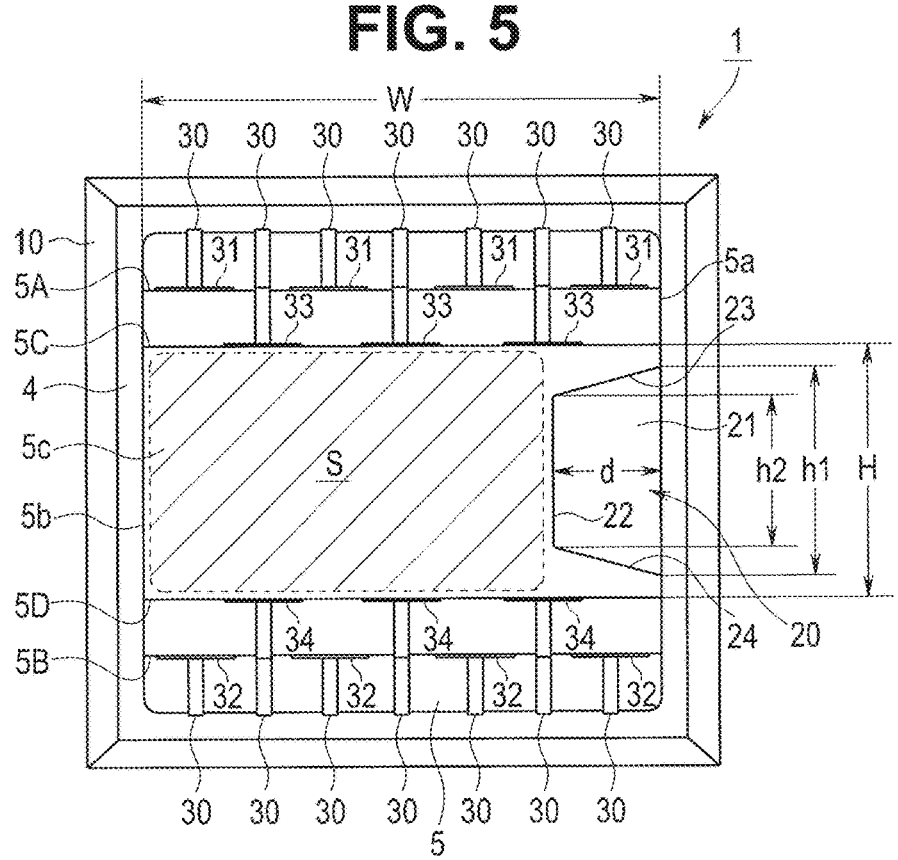
FIG. 5 is a rear view of the image pickup unit.

Specifically, as shown in FIG. 5, the dimension of the recessed portion 20 in the up-down direction is set such that a height h2 of the bottom surface 22 is smaller than a height h1 of an opening of the first side surface 5a. In other words, the recessed portion 20 is a truncated-square-pyramid-shaped ditch portion having a tapered shape that becomes smaller from the opening of the first side surface 5a toward the bottom surface 22.

Thus, the recessed portion 20, when viewed from the proximal end surface 5c side of the irregularly-shaped circuit substrate 5, has a tapered shape in which the separation distance between the two inclined surfaces 23, 24 becomes smaller from the opening of the first side surface 5a, which is a side surface opening portion, toward the bottom surface 22.

As shown in FIG. 6, in some cases, handling, transportation, and the like in the manufacturing process of the image pickup unit 1 are performed by using a mounter apparatus for a production machine, which is provided with a suction holding tool 140 such as a suction nozzle, a suction collet, or the like.

At this time, if the surface of the glass lid 3 of the image pickup unit 1 is sucked by the suction holding tool 140, the surface of the glass lid 3 may possibly be scratched. Therefore, the handling, transportation, and the like of the image pickup unit 1 are performed by sucking the proximal end surface 5c of the irregularly-shaped circuit substrate 5 by the suction holding tool 140.

For this purpose, in the image pickup unit 1 according to the present embodiment, a predetermined depth d of the recessed portion 20 is set in order to secure a plane S, which has an area required for suction by the suction holding tool 140, on the proximal end surface 5c of the irregularly-shaped circuit substrate 5 (see FIG. 5).

Specifically, the dimension of the proximal end surface 5c of the irregularly-shaped circuit substrate 5 is set such that the height H in the up-down direction is smaller than the width W in the left-right direction (W>H). In other words, the proximal end surface 5c of the irregularly-shaped circuit substrate 5 has a rectangular shape with the long sides in the left-right direction and the short sides in the up-down direction.

The depth d of the recessed portion 20 is set such that the maximum dimension thereof is equal to the value obtained by subtracting the height H from the width W of the proximal end surface 5c. In other words, the depth d of the recessed portion 20 is set to a dimension equal to or smaller than the value obtained by subtracting the height H from the width W of the proximal end surface 5c (W−H>d).

Thus, the recessed portion 20 is configured such that the depth d, which is a distance from the opening of the first side surface 5a to the bottom surface 22 in the direction parallel to the third side surface 5A (also parallel to the light-receiving surface of the image pickup device 2), is set to a dimension equal to or shorter than a third length (W−H) obtained by subtracting the height H (second length) of the proximal end surface 5c in the direction parallel to the first side surface 5a (and the light-receiving surface of the image pickup device 2) from the width W (first length) of the proximal end surface 5c in the direction parallel to the third side surface 5A (and the light-receiving surface of the image pickup device 2) (W−H≥d).

The dimension of the depth d of the recessed portion 20 is thus set, to thereby secure the area of the plane S, which is a region sucked by the suction holding tool 140, on the proximal end surface 5c of the irregularly-shaped circuit substrate 5. The region of the plane S secured on the proximal end surface 5c is equal to or larger than a region including the square region with dimensions of the width H by the height H, that is, the square region with dimensions of the short side by the short side of the proximal end surface 5c.

Figure 7:
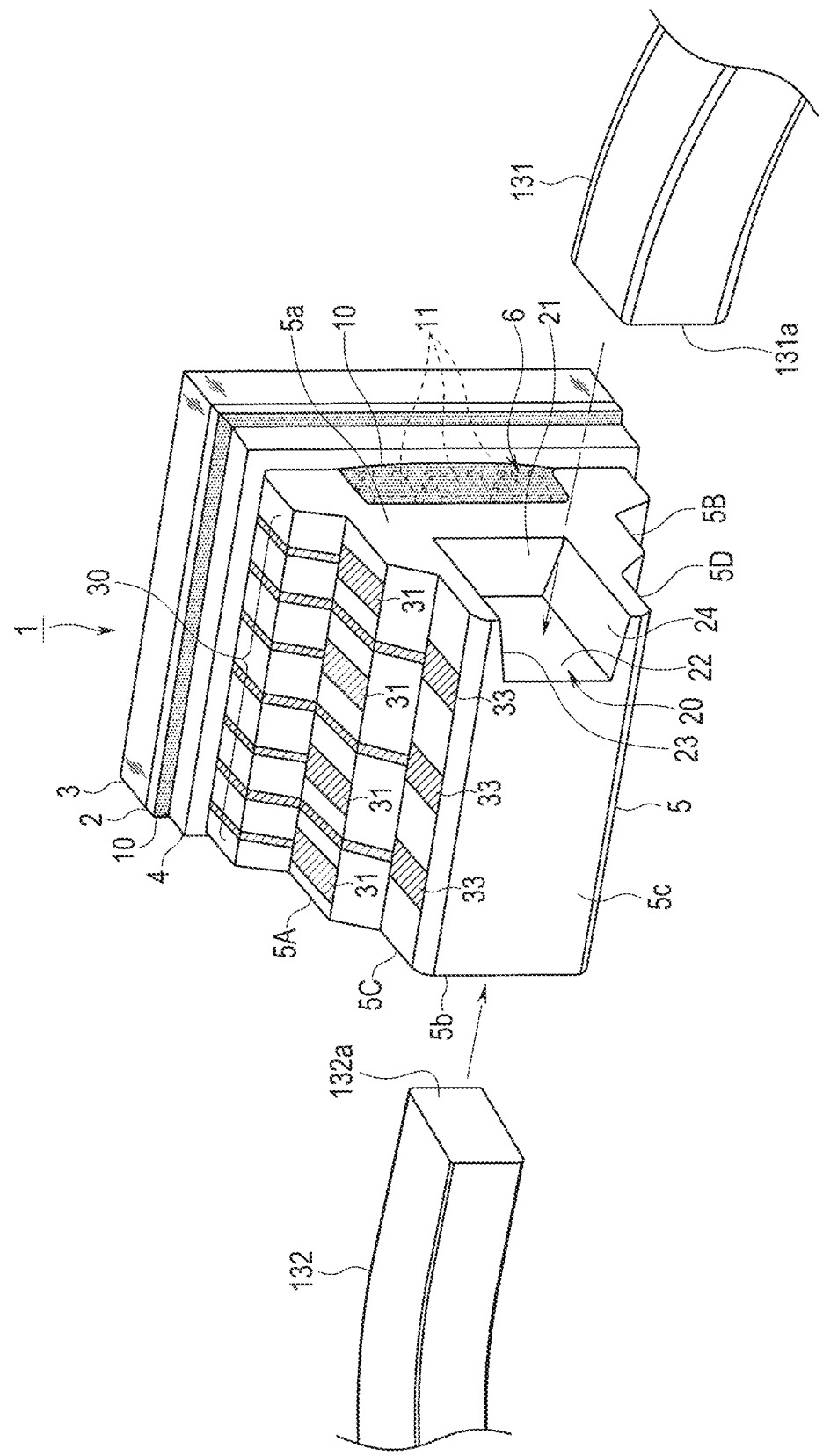
FIG. 7 is a perspective view, which is viewed from rearward, showing a state before the image pickup unit is gripped by arms of a gripping tool.
Figure 8:
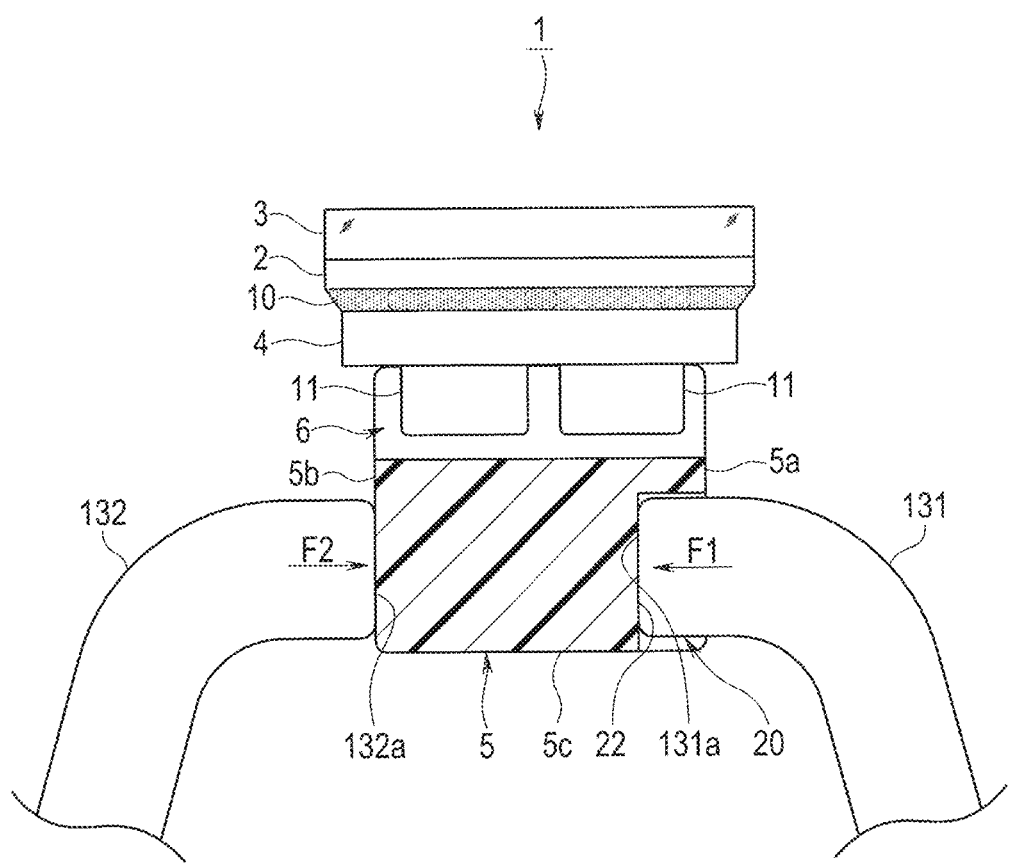
FIG. 8 is a partial cross-sectional view showing a state where the image pickup unit is gripped by the arms of the gripping tool.

In the image pickup unit 1 configured as described above, in order to stabilize the attitude of the image pickup unit 1 when the cables are soldered, the irregularly-shaped circuit substrate 5 is gripped from the left and right directions by two arms 131, 132 of a gripping tool as a jig, to be held, as shown in FIGS. 7 and 8.

At this time, the one (here, the right side) arm 131 of the gripping tool is inserted into the recessed portion 20 formed in the first side surface 5a of the irregularly-shaped circuit substrate 5. Furthermore, the other (here, the left side) arm 132 is brought into contact with the second side surface 5b (further contact with the proximal end surface 5c, as needed)

of the irregularly-shaped circuit substrate 5. Thus, the image pickup unit 1 is gripped by the two arms 131, 132.

Note that an end surface 131*a* of the one arm 131 is brought into contact with the bottom surface 22 that forms the recessed portion 20 of the irregularly-shaped circuit substrate 5. At this time, the arm 131 is guided by the two upper and lower inclined surfaces 23, 24 that form the recessed portion 20, and thereby the end surface 131*a* smoothly contacts the bottom surface 22 that forms the recessed portion 20.

Furthermore, in the image pickup unit, an end surface 132*a* of the other arm 132 may be in contact with the second side surface 5*b* and an inner surface of the arm 132 may further be in contact with the proximal end surface 5*c* as needed.

In the state where the image pickup unit 1 is gripped by the gripping tool, the image pickup unit 1 is pressed so as to be pinched between the two end surfaces 131*a*, 132*a* of the two arms 131, 132 by predetermined gripping forces F1 and F2 acting inwardly, as shown in FIG. 8. In other words, the image pickup unit 1 is held by the two surfaces of the irregularly-shaped circuit substrate 5, that is, the bottom surface 22 and the second side surface 5*b* being brought into contact respectively with the two end surfaces 131*a*, 132*b* of the gripping tool, to be pinched between the two end surfaces.

In the state where the image pickup unit 1 is thus gripped by the gripping tool, the one arm 131 is inserted into the recessed portion 20 formed in the irregularly-shaped circuit substrate 5 and the second side surface 5*b* is gripped by the other arm 132 in contact with the other arm. Therefore, the attitude of the image pickup unit 1 is stabilized even with the small gripping forces F1, F2.

Figure 9:
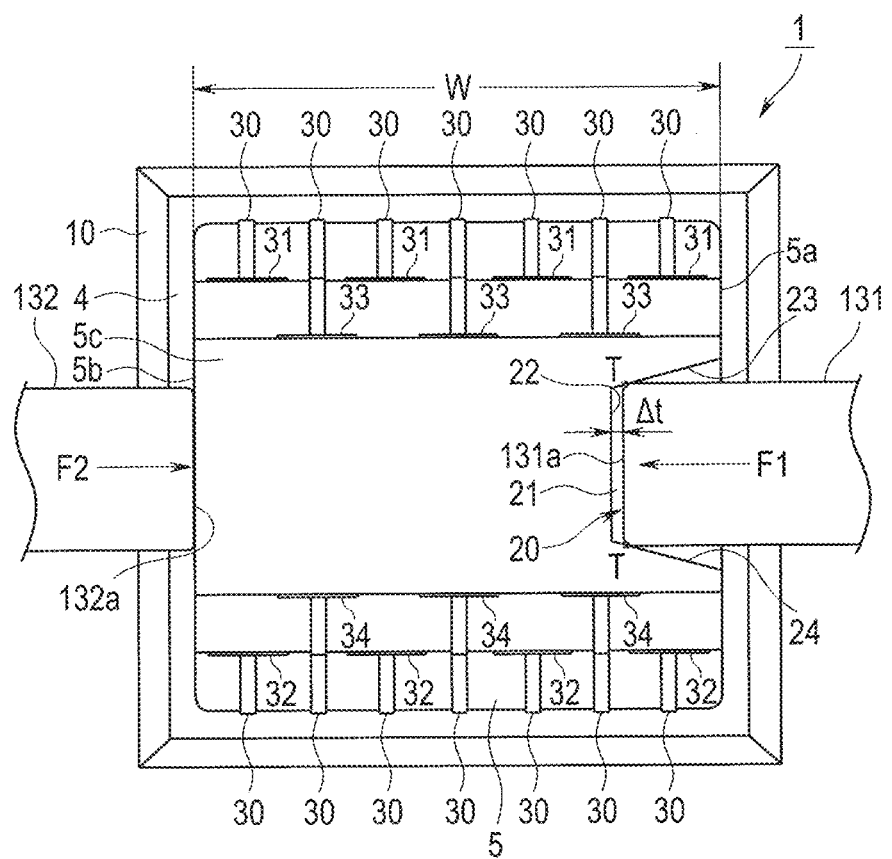
FIG. 9 is a rear view showing the state where the image pickup unit is gripped by the arms of the gripping tool.

Note that, as shown in FIG. 9, the one arm 131 of the gripping tool, which is inserted into the recessed portion 20, is large, to thereby create a gap At between the end surface 131*a* and the bottom surface 22 of the recessed portion 20, and even in the case where the end surface 131*a* does not contact the bottom surface 22, the upper and lower corner sides T of the end surface 131*a* are in contact respectively with the two inclined surfaces 23, 24. As a result, the image pickup unit 1 is stably gripped by the gripping tool.

Figure 10:
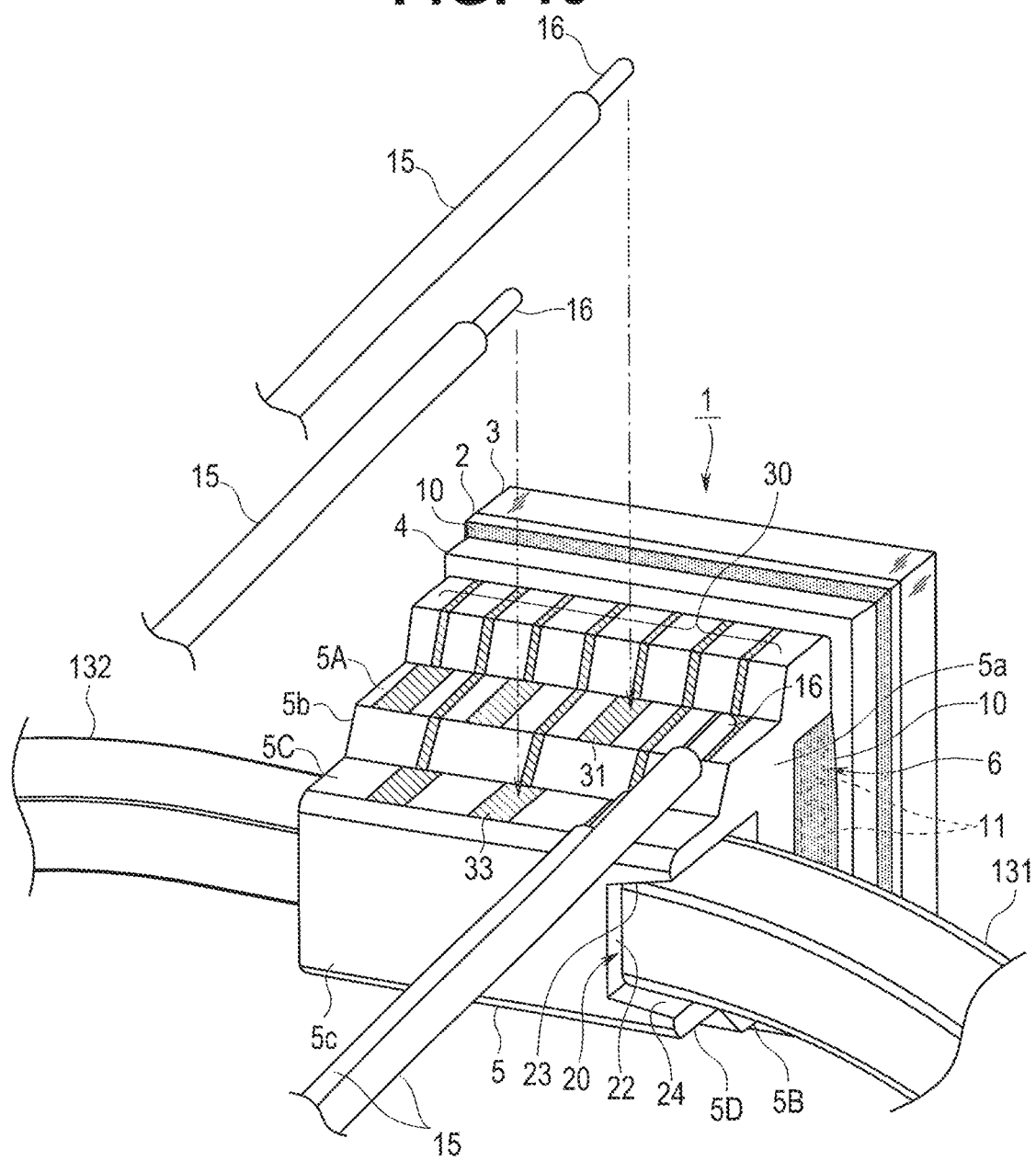
FIG. 10 is a perspective view, which is viewed from rearward, showing a state where the image pickup unit is gripped by the arms of the gripping tool and image pickup cables are soldered.

The image pickup unit 1 thus stably gripped by the gripping tool is configured, as shown in FIG. 10, such that the core wires 16 of the image pickup cables 15 are soldered to the respective cable connecting lands 31, 32, 33, and 34 formed respectively on the third side surface 5A, the fourth side surface 5B, the fifth side surface 5C, and the sixth side surface 5D of the irregularly-shaped circuit substrate 5.

Figure 11:
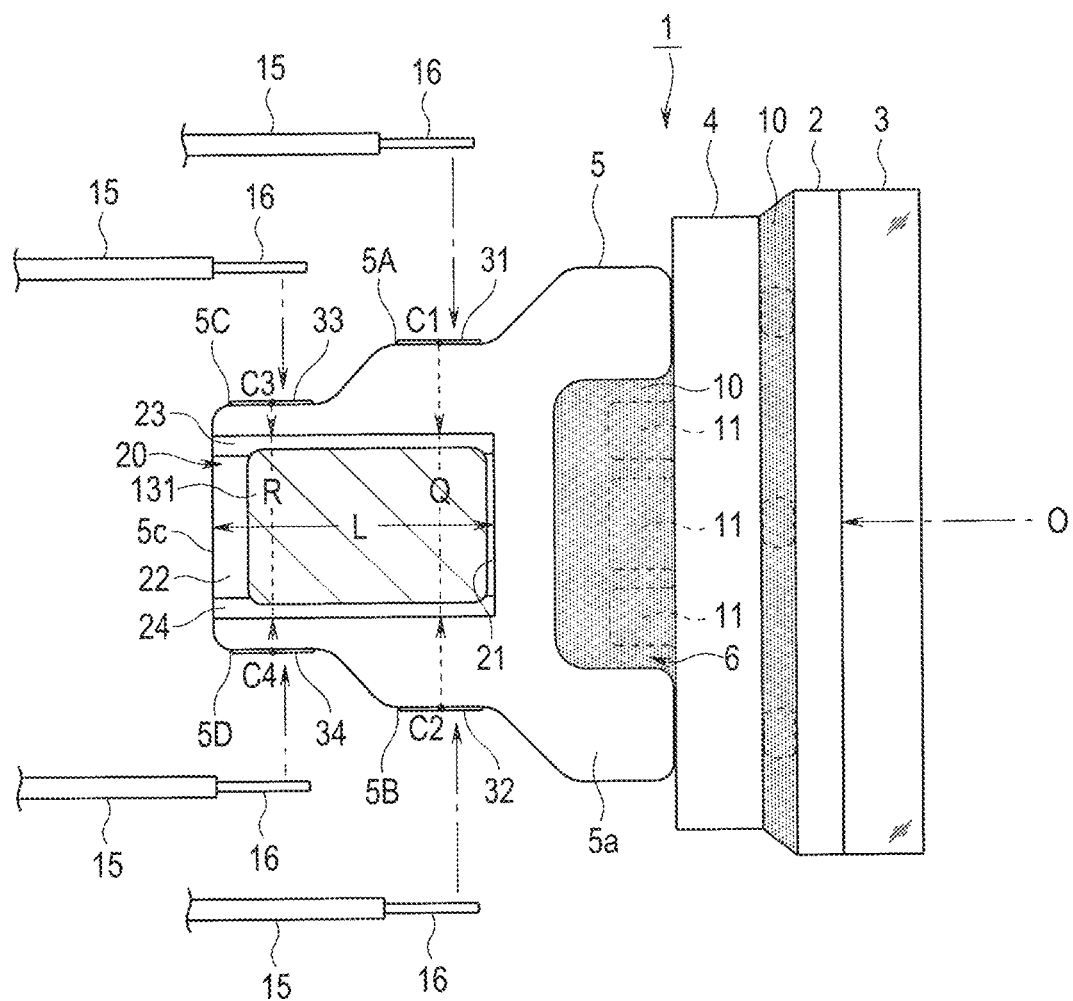
FIG. 11 is a side view showing the state where the image pickup unit is gripped by the arms of the gripping tool and the image pickup cables are soldered.

Note that, as shown in FIG. 11, the recessed portion 20 of the irregularly-shaped circuit substrate 5 has a predetermined length L along the optical axis O. The predetermined length L is set such that the recessed portion 20 is formed up to the position overlapping the third side surface 5A and the fourth side surface 5B that are located at the midway positions of the irregularly-shaped circuit substrate 5. The recessed portion 20 is formed, in the direction orthogonal to the light-receiving surface of the image pickup device 2, at a position overlapping at least a part of the plurality of cable connecting lands 31 (first electrodes) and at least a part of the plurality of cable connecting lands 32 (second electrodes). The recessed portion 20 has the predetermined length L set so as to cross at least a plane intersecting the optical axis O and passing through the centers C1 and C2 of the cable connecting lands 31 and 32 that are provided respectively on the third side surface 5A and the fourth side surface 5B in the direction along the optical axis O (the plane including an axis Q passing through the centers C1 and C2 and intersecting the optical axis O).

With such a configuration, the recessed portion 20 crosses also a plane intersecting the optical axis O and passing through the centers C3 and C4 of the cable connecting lands 33 and 34 that are provided respectively on the fifth side surface 5C and the sixth side surface 5D in the direction along the optical axis O (the plane including an axis R passing through the centers C3 and C4 and intersecting the optical axis O). Thus, the recessed portion 20 of the irregularly-shaped circuit substrate 5 has the predetermined length overlapping the centers C1, C2, C3, and C4 of the respective cable connecting lands 31, 32, 33, and 34 in the direction orthogonal to the light-receiving surface of the image pickup device 2. In other words, when a one-dimensional coordinate system is defined in the direction orthogonal to the light-receiving surface of the image pickup device 2, the one-dimensional coordinate range in which the recessed portion 20 is provided includes the respective one-dimensional coordinates of the centers C1, C2, C3, and C4.

With such a configuration, the image pickup unit 1 is gripped by the arm 131 of the gripping tool being inserted into the vicinity of the end surface 21 on the front side of the recessed portion 20, to thereby enable the attitude of the image pickup unit 1 to be stabilized with the small gripping forces F1 and F2.

Therefore, the attitude of the image pickup unit 1 does not incline when the core wires 16 of the image pickup cables 15 are soldered to the respective cable connecting lands 31, 32, 33, and 34 by a soldering iron being pressed aiming at the center portions of the core wires 16 of the image pickup cables 15. In other words, even if a moment of force is generated by the soldering iron being pressed during the soldering, the attitude of the image pickup unit 1 is maintained by the gripping tool, to thereby prevent the attitude from inclining.

As described above, the image pickup unit 1 is gripped between the two arms 131, 132, with the arm 131 of the gripping tool being inserted into the recessed portion 20 of the irregularly-shaped circuit substrate 5 at the time of soldering the respective image pickup cables 15, and the image pickup unit 1 is stably held, with the attitude thereof being stabilized. Therefore, when the image pickup unit 1 is held, there is no need for gripping the planar circuit substrate 4 from the side surfaces thereof. With such a configuration, the thickness of the planar circuit substrate 4 does not have to be increased.

Thus, in the image pickup unit 1, the part to be gripped by the gripping tool as a jig is not the planar circuit substrate 4 but the irregularly-shaped circuit substrate 5. Therefore, even if further miniaturization of the image pickup unit 1 is achieved by decreasing the thickness of the planar circuit substrate 4, the attitude of the image pickup unit 1 does not become unstable at the time of soldering the cables, to thereby prevent workability from deteriorating.

Furthermore, in the image pickup unit 1, the planar circuit substrate 4 is not gripped by the gripping tool, which prevents the thin planar circuit substrate 4 from being damaged.

The image pickup unit 1 as described above has such a configuration that miniaturization is achieved, the stable attitude can be maintained when the image pickup unit 1 is gripped by the gripping tool, and deterioration of the workability at the time of soldering cables can be suppressed.

Note that, as the configuration of the image pickup unit 1, the configuration in which the recessed portion 20 is formed on the first side surface 5*a* of the irregularly-shaped circuit substrate 5 is exemplified. However, the image pickup unit 1 is not limited to this configuration, and the recessed portion 20 may be formed in the second side surface 5b of the irregularly-shaped circuit substrate 5. In other words, the recessed portion 20 may be formed in one of the first side surface 5a and the second side surface 5b.

First Modified Example

Figure 12:
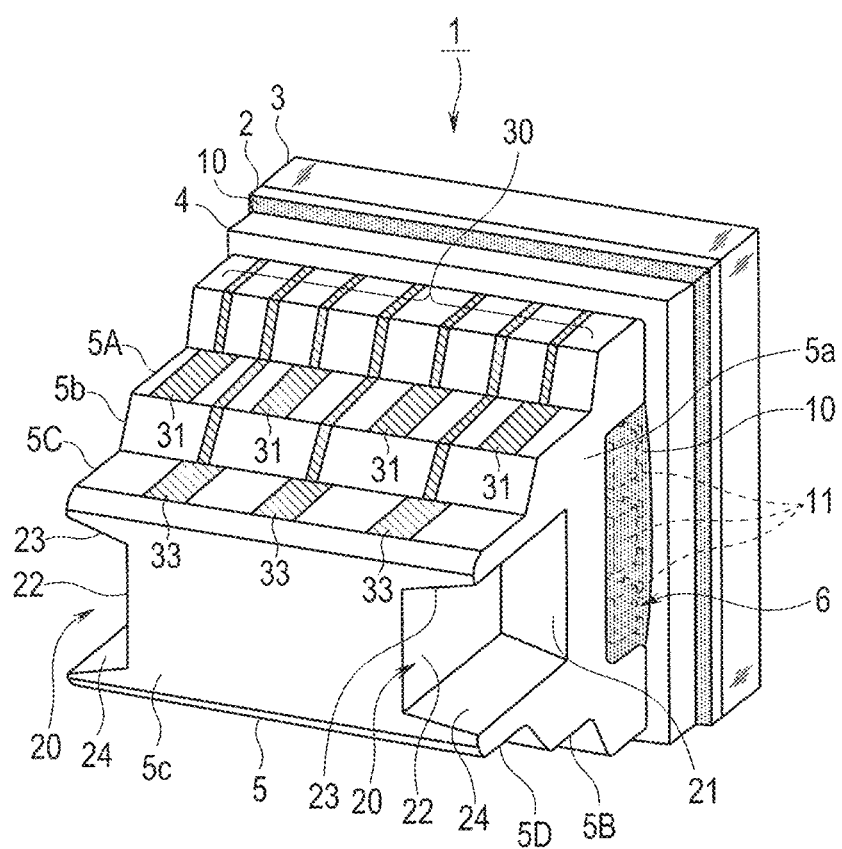
FIG. 12 is a perspective view, which is viewed from rearward, of an image pickup unit according to a first modified example.
Figure 13:
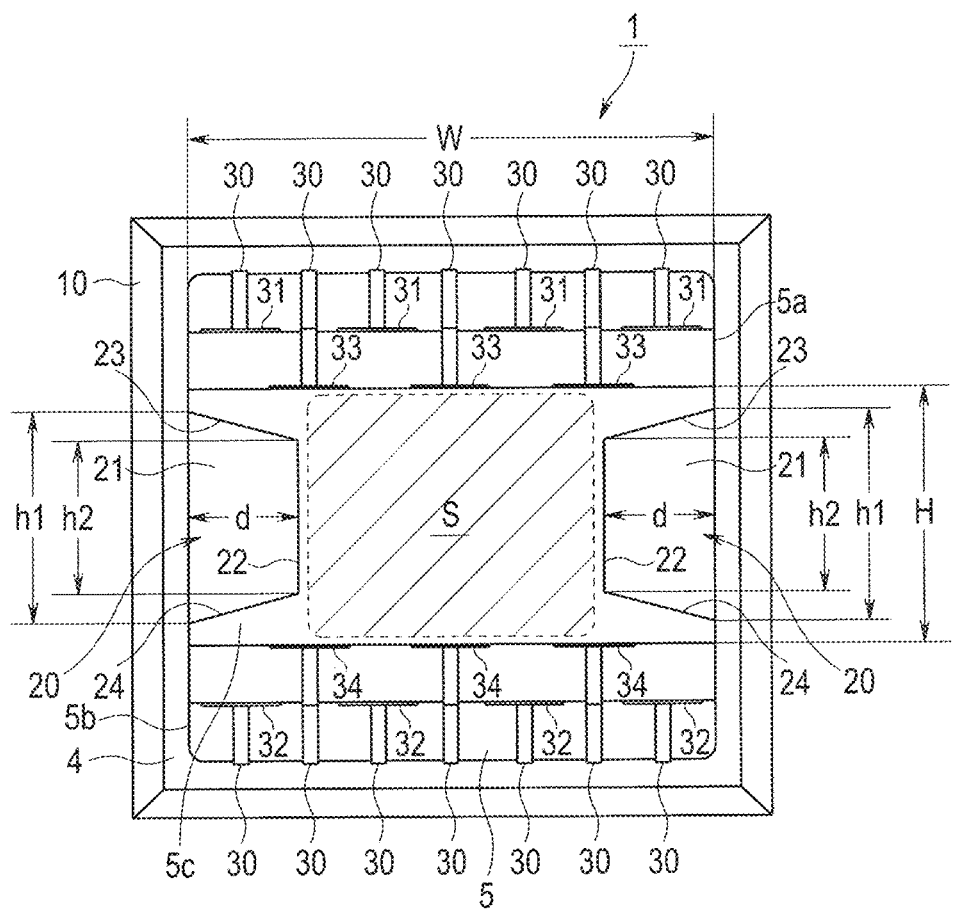
FIG. 13 is a rear view of the image pickup unit according to the first modified example.

As shown in FIG. 12, a recessed portion 20 formed in the irregularly-shaped circuit substrate 5 of the image pickup unit 1 may be provided also in the second side surface 5b in addition to the first side surface 5a (that is, in both of the first side surface 5a and the second side surface 5b). Note that in this case, as shown in FIG. 13, each of the recessed portion 20 in the second side surface 5b and the recessed portion 20 in the first side surface 5a is set to have a dimension satisfying the condition that a value obtained by subtracting the height H in the up-down direction from the width W in the left-right direction (W−H) is equal to or larger than twice of the depth d (W−H≥2d).

In other words, the irregularly-shaped circuit substrate 5 which is the second substrate includes two recessed portions 20 formed in the left-right direction. Each of the recessed portion 20 has an opening, a bottom surface 22, and inclined surfaces 23, 24 which are inner surfaces formed so as to be tapered from the opening toward the bottom surface 22.

Each of the two recessed portions 20 has a dimension of {d≤(W−H)/2} in which the depth d as a distance from the opening to the bottom surface 22 in the direction parallel to the third side surface 5A of the irregularly-shaped circuit substrate 5 (direction parallel also to the light-receiving surface of the image pickup device 2) is set to be equal to or smaller than one-half of a third length (W−H) obtained by subtracting the height H (second length) of the proximal end surface 5c in the direction parallel to the first side surface 5a (and the light-receiving surface of the image pickup device 2) from the width W (first length) of the proximal end surface 5c in the direction parallel to the third side surface 5A (and the light-receiving surface of the image pickup device 2).

The dimension of the depth d of each of the recessed portions 20 in the first side surface 5a and the second side surface 5b is thus set, to thereby secure a plane S, which is a region sucked by the suction holding tool 140, on the proximal end surface 5c of the irregularly-shaped circuit substrate 5. Also in this case, the region of the plane S secured on the proximal end surface 5c is equal to or larger than a region including a square region with dimensions of the width H by the height H, that is, the square region with dimensions of the short side by the short side of the proximal end surface 5c.

Figure 14:
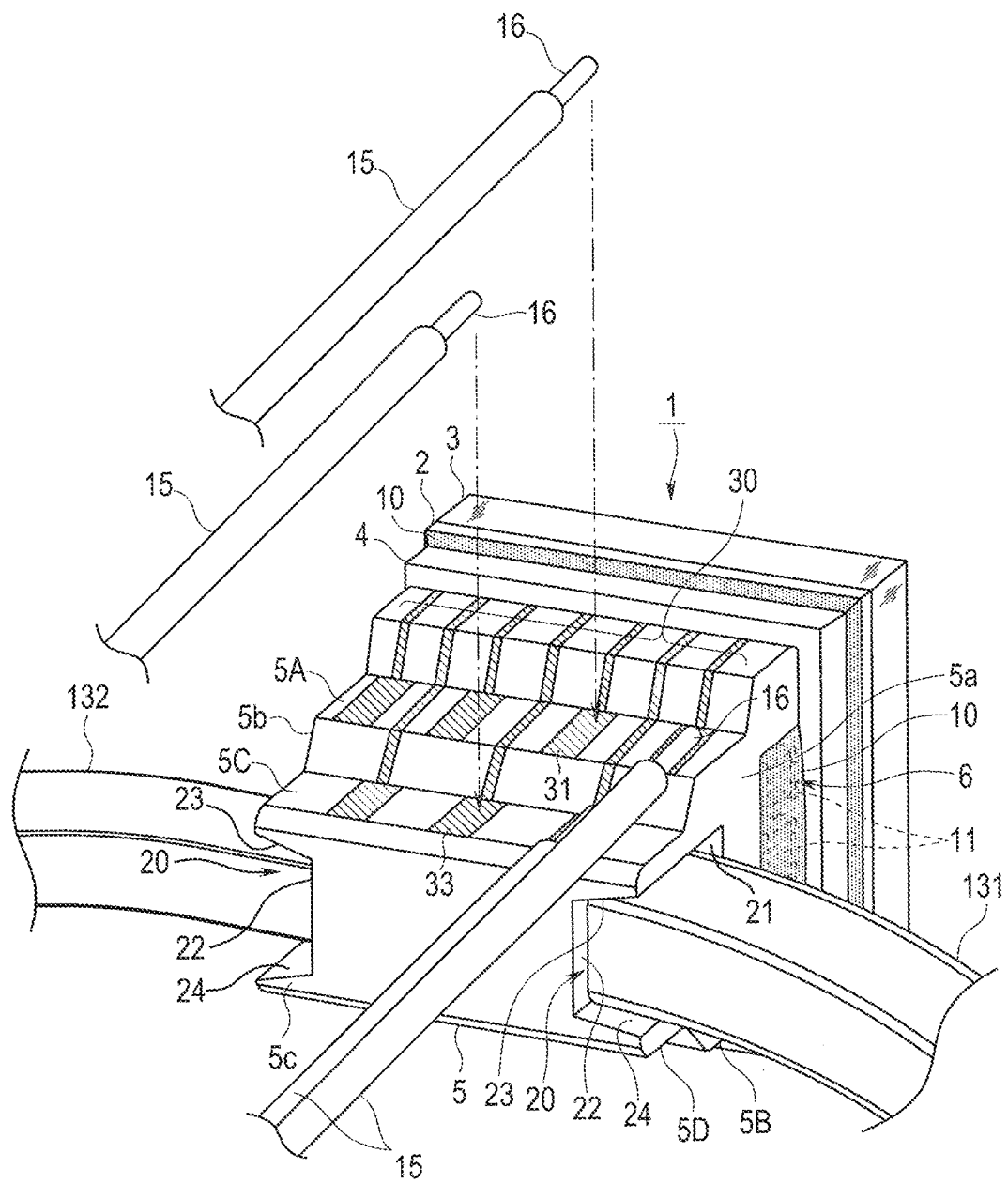
FIG. 14 is a perspective view, which is viewed from rearward, showing a state where the image pickup unit according to the first modified example is gripped by the arms of the gripping tool and the image pickup cables are soldered.

As shown in FIG. 14, at the time of soldering the respective image pickup cables 15, the image pickup unit 1 according to the present modified example can also be gripped, with the attitude thereof being made more stable, by the arms 131, 132 of the gripping tool being inserted respectively into the two recessed portions 20 of the irregularly-shaped circuit substrate 5, to pinch the image pickup unit between the two arms 131, 132.

Second Modified Example

Figure 15:
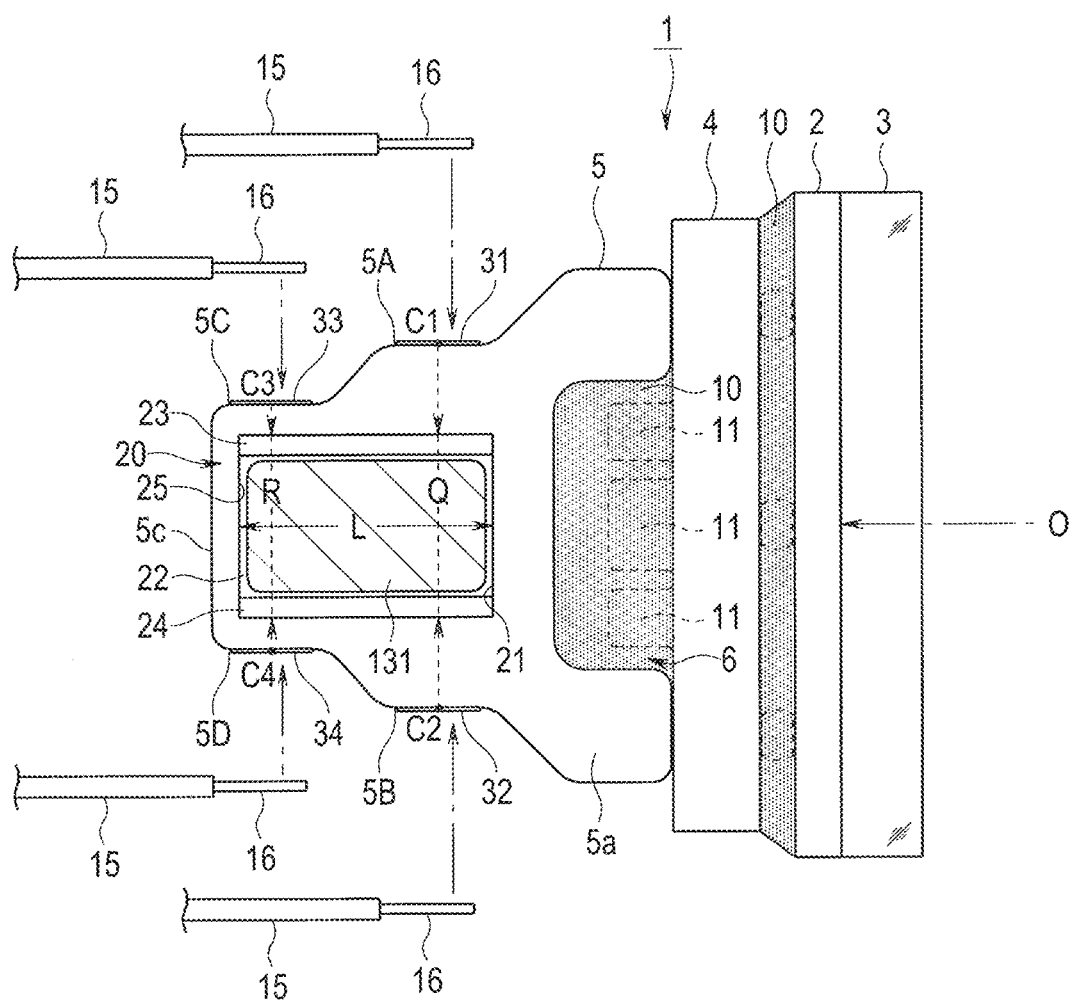
FIG. 15 is a side view showing a state where an image pickup unit according to a second modified example is gripped by the arms of the gripping tool and the image pickup cables are soldered.

As shown in FIG. 15, a recessed portion 20 formed on the irregularly-shaped circuit substrate 5 of the image pickup unit 1 may be configured not to open on the proximal end surface 5c side of the irregularly-shaped circuit substrate 5. In other words, the irregularly-shaped circuit substrate 5 has an end surface 25 also on the proximal end side on which the recessed portion 20 is formed. Therefore, the recessed portion 20 is formed so as to be open only on the first side surface 5a, and the proximal end of the recessed portion 20 in the direction along the optical axis O is non-through.

Note that the recessed portion 20 of the irregularly-shaped circuit substrate 5 according to the present modified example also has a predetermined length L overlapping the centers C1, C2, C3, and C4 of the respective cable connecting lands 31, 32, 33, and 34 in the direction orthogonal to the light-receiving surface of the image pickup device 2. In this case, the predetermined length L of the recessed portion 20 along the optical axis O is a distance between the front side end surface 21 and the proximal end side end surface 25. In addition, the recessed portion 20 crosses both of a plane including an axis Q and intersecting the optical axis O and a plane including an axis R and intersecting the optical axis O (the predetermined length L is thus set).

Third Modified Example

Figure 16:
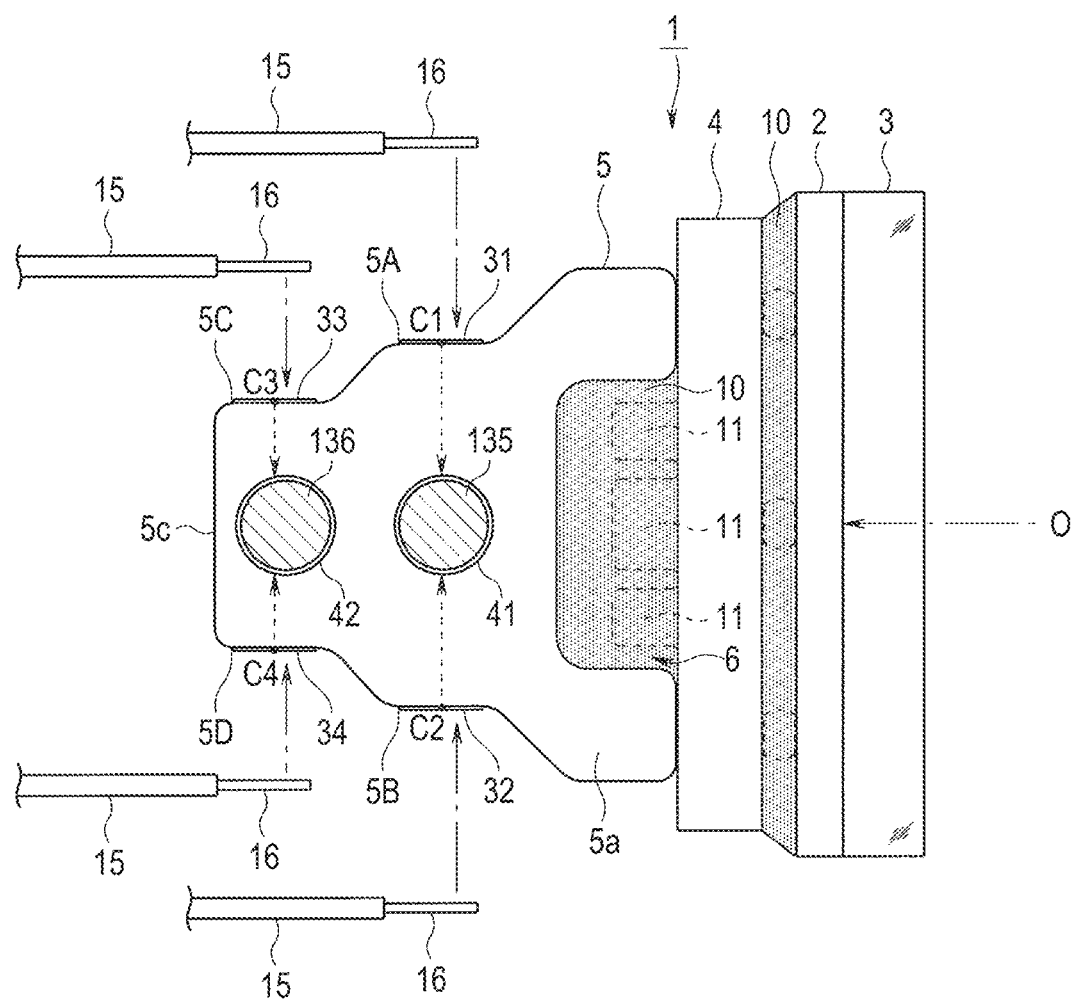
FIG. 16 is a side view showing a state where an image pickup unit according to a third modified example is gripped by the arms of the gripping tool and the image pickup cables are soldered.

As shown in FIG. 16, in the image pickup unit 1, instead of the recessed portion 20, two through holes 41 and 42 that are open respectively on the first side surface 5a and the second side surface 5b may be formed in the irregularly-shaped circuit substrate 5.

Note that the front side through hole 41 is formed at a position overlapping the centers C1 and C2 of the respective cable connecting lands 31 and 32, in the direction orthogonal to the light-receiving surface of the image pickup device 2. In addition, the rear side through hole 42 is formed at a position overlapping the centers C3 and C4 of the respective cable connecting lands 33 and 34, in the direction orthogonal to the light-receiving surface of the image pickup device 2.

The image pickup unit 1 is gripped by cylindrical-shaped rods 135, 136 provided to a gripping tool being inserted respectively into the two through holes 41,42. Thus, the image pickup unit 1 according to the present modified example is gripped by the gripping tool, and held with the attitude thereof being stabilized.

The disclosure recited in the above-described embodiment and the modified examples is not limited to the embodiment and the modified examples, and various modifications are possible at the practical stage in a range without departing from the gist of the disclosure. Furthermore, each of the above embodiment and modified examples includes the disclosures at various stages, and various disclosures can be extracted by appropriately combining a plurality of disclosed components.

For example, even if some of the components are removed from all the components shown in the above embodiment and modified examples, a configuration from which the components are eliminated can be extracted as a disclosure insofar as the recited problem can be solved and the recited effects of the disclosure can be obtained.

What is claimed is:
1. An image pickup unit comprising,
an image pickup device, a first substrate, and a second substrate that are connected in this order, wherein
the second substrate comprises:
a side surface formed in a direction crossing a light-receiving surface of the image pickup device, and
a recessed portion into which a jig is inserted to hold the image pickup unit, the recessed portion being formed in the side surface.

2. The image pickup unit according to claim 1, wherein
the second substrate includes a first side surface and a second side surface, the first side surface being formed in a direction crossing the light-receiving surface of the image pickup device, the second side surface being located on an opposite side of the first side surface, and
the recessed portion is formed in one or both of the first side surface and the second side surface.

3. The image pickup unit according to claim 2, wherein
the second substrate includes a third side surface intersecting the first side surface and the second side surface,
the third side surface includes a first electrode for connecting a cable, and
the recessed portion is formed at a position overlapping at least a part of the first electrode in a direction orthogonal to the light-receiving surface of the image pickup device.

4. The image pickup unit according to claim 3, wherein
the recessed portion is formed at a position overlapping a center of the first electrode in the direction orthogonal to the light-receiving surface of the image pickup device.

5. The image pickup unit according to claim 4, wherein
the second substrate includes a fourth side surface located on an opposite side of the third side surface,
the fourth side surface includes a second electrode for connecting a cable, and
the recessed portion is formed at a position overlapping a center of the first electrode and a center of the second electrode in the direction orthogonal to the light-receiving surface of the image pickup device.

6. The image pickup unit according to claim 5, wherein
the second substrate includes a fifth side surface and a sixth side surface, the fifth side surface being formed on a proximal end side with respect to the third side surface, the sixth side surface being located on an opposite side of the fifth side surface,
the fifth side surface and the sixth side surface respectively include a third electrode and fourth electrode each for connecting a cable, and
the recessed portion is formed at a position overlapping a center of the third electrode and a center of the fourth electrode in the direction orthogonal to the light-receiving surface of the image pickup device.

7. The image pickup unit according to claim 3, wherein
the second substrate includes a fourth side surface located on an opposite side of the third side surface,
the fourth side surface includes a second electrode for connecting a cable, and
the recessed portion is formed at a position overlapping at least a part of the first electrode and at least a part of the second electrode in the direction orthogonal to the light-receiving surface of the image pickup device.

8. The image pickup unit according to claim 7, wherein
the second substrate includes a fifth side surface and a sixth side surface, the fifth side surface being formed on a proximal end side with respect to the third side surface, the sixth side surface being located on an opposite side of the fifth side surface,
the fifth side surface and the sixth side surface respectively include a third electrode and fourth electrode each for connecting a cable, and
the recessed portion is formed at a position overlapping at least a part of the third electrode and at least a part of the fourth electrode in the direction orthogonal to the light-receiving surface of the image pickup device.

9. The image pickup unit according to claim 3, wherein
the second substrate includes a proximal end surface formed on a proximal end,
the recessed portion includes an opening, a bottom surface, and an inner surface formed so as to be tapered from the opening toward the bottom surface, and
a distance from the opening to the bottom surface in a direction parallel to the third side surface has a dimension set to be equal to or shorter than a third length obtained by subtracting a second length of the proximal end surface in a direction parallel to the first side surface from a first length of the proximal end surface in the direction parallel to the third side surface.

10. The image pickup unit according to claim 3, wherein
the second substrate includes a proximal end surface formed on a proximal end,
the recessed portion includes an opening, a bottom surface, and an inner surface formed so as to be tapered from the opening toward the bottom surface, and
a distance from the opening to the bottom surface in a direction parallel to the third side surface has a dimension set to be equal to or shorter than one-half of a third length obtained by subtracting a second length of the proximal end surface in a direction parallel to the first side surface from a first length of the proximal end surface in the direction parallel to the third side surface.

11. The image pickup unit according to claim 1, wherein
the recessed portion includes an opening, a bottom surface, and an inner surface formed so as to be tapered from the opening toward the bottom surface.

12. An image pickup unit comprising
an image pickup device, a first substrate, and a second substrate that are connected in this order, wherein
the second substrate comprises:
a base material with no interface;
a plurality of wirings provided on a surface of the base material;
a side surface formed in a direction crossing a light-receiving surface of the image pickup device; and
a recessed portion into which a jig is inserted to hold the image pickup unit, the recessed portion being formed in the side surface.

13. An endoscope comprising:
an insertion portion configured to be inserted into a subject;
an image pickup unit provided in the insertion portion, wherein
the image pickup unit comprises,
an image pickup device, a first substrate, and a second substrate that are connected in this order from a distal end side, wherein
the second substrate includes a side surface formed in a direction crossing a light-receiving surface of the image pickup device, and
the side surface includes a recessed portion into which a jig is inserted to hold the image pickup unit.

* * * * *